(12) United States Patent
Duncan

(10) Patent No.: US 10,864,999 B1
(45) Date of Patent: Dec. 15, 2020

(54) CESSNA TAIL-CONE REINFORCEMENT ANGLE SPLICE, INSTALLATION KIT, AND METHOD FOR INSTALLATION THEREOF

(71) Applicant: QMI, Inc., Joseph, OR (US)

(72) Inventor: William D. Duncan, Joseph, OR (US)

(73) Assignee: QMI, Inc., Joseph, OR (US)

( * ) Notice: Subject to any disclaimer, the term of this patent is extended or adjusted under 35 U.S.C. 154(b) by 0 days.

(21) Appl. No.: 16/930,542

(22) Filed: Jul. 16, 2020

Related U.S. Application Data

(60) Provisional application No. 62/875,542, filed on Jul. 18, 2019.

(51) Int. Cl.
- B64F 5/40 (2017.01)
- B64F 5/10 (2017.01)
- B64C 1/06 (2006.01)

(52) U.S. Cl.
CPC .............. B64F 5/40 (2017.01); B64C 1/0685 (2020.01); B64F 5/10 (2017.01)

(58) Field of Classification Search
CPC ............. B64F 5/40; B64F 5/10; B64C 1/0685
See application file for complete search history.

(56) References Cited

U.S. PATENT DOCUMENTS

| | | | | |
|---|---|---|---|---|
| 3,879,916 A | * | 4/1975 | Bigham | F16B 5/0072 52/463 |
| 7,823,362 B2 | * | 11/2010 | Meyer | B64C 1/069 52/713 |
| 8,960,606 B2 | * | 2/2015 | Diep | B64C 1/069 244/132 |
| 8,985,514 B2 | * | 3/2015 | Cardin | B64C 1/069 244/131 |
| 2014/0117157 A1 | * | 5/2014 | Diep | B64C 1/12 244/120 |
| 2014/0224932 A1 | * | 8/2014 | Cardin | B29D 99/001 244/119 |

* cited by examiner

*Primary Examiner* — Philip J Bonzell
(74) *Attorney, Agent, or Firm* — Mattingly & Malur, PC

(57) ABSTRACT

A tail-cone reinforcement angle of a Cessna 180-185 series aircraft is repaired by the removal of an aft most section of that tail-cone reinforcement angle and its replacement with an elongated splice body. The elongated splice body is attached to the remainder of the tail-cone reinforcement angle and to the tail-cone portion of the fuselage of the aircraft. The aft section of the original tail-cone reinforcement angle is subject to the development and propagation of cracks in the area of the rear pivot shaft receiving bore, which cracks render the aircraft unfit for use. The invention includes the provision of a suitable elongated splice body, a method for its installation, and a tool kit which is usable in accomplishing the removal and replacement of the aft section of the tail-cone reinforcement angle.

10 Claims, 9 Drawing Sheets

| Description | Part Number | QTY. |
| --- | --- | --- |
| LH tail cone reinforcement angle splice | QMI-0712048-7R | 1 |
| RH tail cone reinforcement angle splice | QMI-0712048-6R | 1 |
| Rivet | AN426AD-4-6 | 7 |
| Rivet | AN470AD-5-7 | 3 |
| Bolt | AN525-832R8 | 4 |
| Bolt | AN525-832R10 | 4 |
| Washer | AN960-8 | 3 |
| Nut | MS21043-08 | 3 |
| Drill Bit | #40 | 1 |
| Drill Bit | #30 | 1 |
| Drill Bit | #21 | 1 |
| Drill Bit | #19 | 1 |
| Drill Bit | 15/64" Dia. | 1 |
| Reamer | ¼" Dia. | 1 |
| Guard | QMI-004 | 1 |
| Hack Saw Blade | | 1 |
| Hack Saw Handle | | 1 |
| Drill Guide Assembly | QMI-002 | 1 |

FIG. 13

CESSNA TAIL-CONE REINFORCEMENT ANGLE SPLICE, INSTALLATION KIT, AND METHOD FOR INSTALLATION THEREOF

CROSS REFERENCE TO RELATED APPLICATIONS

This U.S. utility patent application claims the benefit of the filing date of prior U.S. provisional patent application Ser. No. 62/875,542, entitled CESSNA TAIL-CONE REINFORCEMENT, and filed on Jul. 18, 2019, the disclosure of which is incorporated herein in its entirety by reference.

FIELD OF THE INVENTION

The present invention is directed to a tail-cone reinforcement angle splice assembly; to an installation kit for use in the removal and replacement of the original tail-cone reinforcement angle aft portion and to a method for accomplishing the removal and replacement of that original tail-cone reinforcement angle aft portion specifically for use in Cessna aircraft. The tail-cone reinforcement splice, in accordance with the present invention, is usable to replace an original reinforcement angle or original angles on one or both sides of an aircraft's tail cone. The original tail-cone reinforcement angles have been determined to be subject to failure, typically due to cracking and breaking of the original tail-cone replacement angles in areas of potentially high stress.

BACKGROUND OF THE INVENTION

Cessna 180, 182 and 185 series aircraft have been, and continue to be very popular single engine aircraft that have found numerous usages in private and commercial aviation. While these aircraft are no longer currently manufactured, there are still well over seven thousand of these light, durable and dependable aircraft that are registered with the Federal Aviation Administration and that are currently in use. Some of these aircraft are in commercial use while others are the prize possessions of their respective owners, who lavish great care and large sums of money on their preservation, upkeep and usage.

A chronic problem exists in virtually all of these aircraft in their tail-cone reinforcement angle components. This problem exists in the aft area of the tail-cone reinforcement angle of such aircraft and specifically in the aft portions of such tail-cone reinforcement angles, located on either side of the tail-cone, in the interior of the aircraft fuselage and in the area of the location of the rear stabilizer pivot shaft.

As is well known to the owners and operators of these series of aircraft, a so-called "hockey stick" reinforcement angle extends longitudinally along each interior side of the fuselage of the aircraft and serves to reinforce that aft section of the fuselage and specifically serves to prevent that aft section of the fuselage from deflecting inwardly or "oil canning" when lateral forces are applied to the outer rear section of the fuselage. These "hockey sticks" are secured in place along the aft section of each side of the aircraft fuselage by no less than 40 rivets. The aft section or "blade" of each such "hockey stick" constitutes the problematic aft section of each such tail-cone reinforcement angle. This aft section of the reinforcement angle, on each side of the tail cone of the aircraft, includes a through bore or aperture which will receive a pivot shaft of the horizontal stabilizer that is a component of the aircraft's tail assembly.

It had been determined that over time, these tail-cone reinforcement angles fail, under stress, by cracking in the area of the bore. The resultant cracks will propagate along the tail-cone reinforcement angle, in the area of the aft portion thereof, and specifically in the area of the bore or aperture that receives the stabilizer horizontal pivot shaft. If left unrepaired, these cracks will severely impact the attachment of the rear horizontal stabilizer and elevator assemblies to the tail cone of the aircraft. If one of these components fails to operate properly, the resultant loss of control of the aircraft could be catastrophic. The tail-cone reinforcement angle in the affected Cessna aircraft tends to crack at the rear stabilizer pivot shaft attachment point. Virtually all such cracks are formed at the same location in each such tail-cone reinforcement angle. The conventional solution to this problem, once it has been detected in an affected aircraft, has been the removal and replacement of the affected tail-cone reinforcement angle in the one or both affected sides of the fuselage of an affected aircraft. Such removal and replacement requires the drilling out and removal of approximately forty rivets on either side of the aircraft's fuselage. Once these rivets have been removed, the entire tail cone reinforcement angle is then removed from the aircraft and is replaced with an identical replacement assembly. That replacement requires the reinstallation of the approximately forty rivets that have previously been removed.

Such a replacement process does not resolve the underlying problem, the inherent failure of the tail-cone reinforcement angles in the areas of the rear stabilizer pivot shaft. Replacement of a failed part with a replacement part that is also subject to the same issues of failure, is an unsatisfactory solution to the problem of such tail-cone reinforcement angles failures. The prior art solutions to the problem have not provided a satisfactory, reliable, long term solution to the problem.

SUMMARY OF THE INVENTION

The present invention is directed to a tail-cone reinforcement angle splice assembly which is particularly suited for use with Cessna 180 and related series aircraft. The present invention is also directed to an installation kit which facilitates and expedites the replacement of such a tail-cone replacement angle splice. In addition, the subject invention is further directed to a method which accomplished the replacement of a defective aft section of a tail-cone reinforcement angle or a so-called "hockey stick" with a reinforcement angle splice part that prevents recurrence of the failures of the original and prior replacement tail-cone reinforcement angles.

In accordance with the present invention, only the portion of the tail-cone reinforcement angle, which is subject to failure, is replaced. A substantial portion of the original tail-cone reinforcement angle remains in place. Only the defective portion of that tail-cone reinforcement angle is cut-off from the remainder of the tail-cone reinforcement angle, which remains in place. A new tail-cone reinforcement angle splice is attached to the remaining original portion of the tail-cone reinforcement angle and is secured in place.

The tail-cone reinforcement angle splice, in accordance with the present invention, is much stronger and more durable than the original aft portion of the tail-cone reinforcement angle which it replaces. The replacement tail-cone reinforcement angle splice includes the aft horizontal stabilizer pivot bore, which has been the location of the propagating cracks that have been prone to occur in the original tail-cone reinforcement angle stabilizer attachment points. The installation of the tail-cone reinforcement angle splice, in accordance with the present invention, has resulted in a substantial reduction in the labor involved in the repair and replacement of the cracked portion of the tail cone reinforcement angle, as compared to the prior procedure which had involved the removal and replacement of the entire tail-cone reinforcement angle.

As alluded to previously, the replacement of the entire tail-cone reinforcement angle of a Cessna 180 series aircraft, which is typically referred to as the "hockey stick", because of its distinctive shape, had required the drilling out and replacement of approximately forty rivets on either or both sides of the rear fuselage of an affected aircraft. Many of these aircraft are owned by non-commercial pilots who lavish time and attention, not to mention substantial amounts of money, on the care, upkeep and appearance of their aircraft. The drilling out and removal of forty or more rivets on either or both sides of the rear fuselage of such an aircraft, which has been required to remove a complete tail-cone reinforcement angle, effectively destroys the paint that has been applied to that section of the aircraft. Leaving the replacement rivet heads unpainted, or touching up those rivet heads with touch-up paint may be acceptable for some commercial aircraft. However, the majority of owners of such aircraft will require that their aircraft be completely repainted after the completion of the required repairs.

In accordance with the present invention, only the far aft portion of the tail-cone reinforcement angle is removed. That removed portion is replaced with a tail-cone reinforcement angle splice. Such a replacement of only the failed or suspect aft portion of the tail-cone reinforcement angle or angles results in far less cosmetic damage to the aircraft. The aft stabilizer attachment pivot hole portion of the reinforcement angle is the only portion of that reinforcement angle that is cut out and replaced. Such a replacement required the drilling out and replacement of far fewer rivets that would be required if the entire tail-cone reinforcement angle were to be replaced.

The tail-cone reinforcement angle splice, in accordance with the present invention, includes the aft stabilizer pivot shaft receiving bore portion of the tail-cone reinforcement angle. The removal and replacement of only the aft portion of the tail-cone replacement angle, using the splice, in accordance with the present invention, overcomes the serious cosmetic difficulties encountered by the prior procedure of total replacement of the tail-cone reinforcement angle on each side of the rear fuselage of the affected aircraft. The cosmetics of the repaired aircraft are not affected. The time and expense required for the replacement is substantially reduced. The resultant replacement is stronger and more durable than the original aft portion of the tail-cone replacement angle which it replaces.

The present invention provides a reinforcement splice part, a kit which facilitates the replacement of the splice, and a method for such a reinforcement splice installation. The present invention constitutes a substantial advance in the art.

BRIEF DESCRIPTION OF THE DRAWINGS

A full and complete understanding of a Cessna tail-cone reinforcement angle splice, an installation kit therefor, and a method of installation may be had by referring to the detailed description of the preferred embodiment, as set forth hereinafter, and as seen in the accompanying drawings in which:

FIG. 13 is a description in the kit, in accordance with the present invention.

DESCRIPTION OF THE PREFERRED EMBODIMENT

Figure 1:
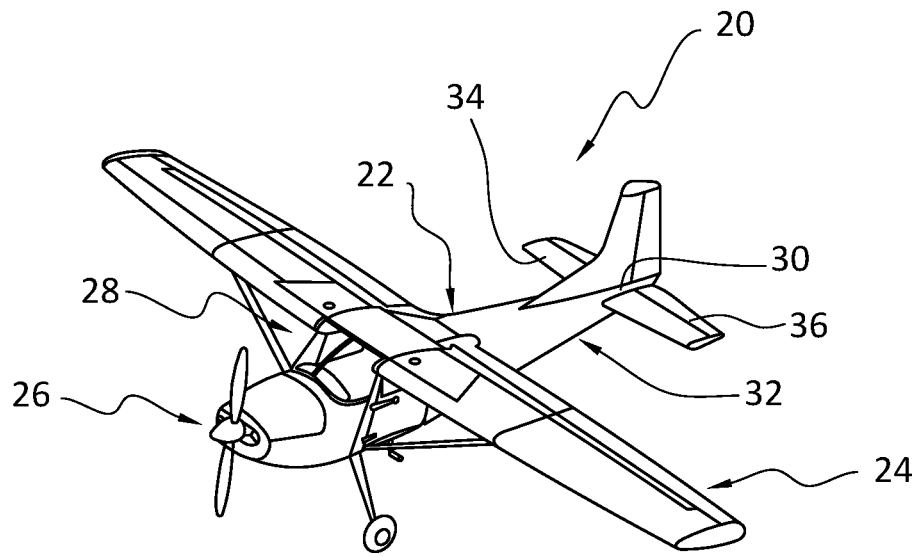
FIG. 1 is a schematic depiction of a Cessna series 180-185 series aircraft with which the pertinent invention is intended for use.

Referring initially to FIG. 1 of the patent drawings filed in the subject U.S. patent application, there may be seen, generally at 20, a typical Cessna 180-185 series aircraft with which the tail-cone reinforcement angle splice, in accordance with the present invention, finds particular usage. Aircraft 20, as is well known to one familiar with such aircraft, includes a fuselage, generally at 22, forward upper mounted wings 24, an engine and propeller assembly 26, a cockpit 28 and a rear elevator and stabilizer assembly generally at 30. The rear elevator and stabilizer assembly generally at 30, is attached to a rear portion of the fuselage 22, in an area that fuselage known as the tail-cone 32, which tail-cone area 32 is seen somewhat schematically in FIG. 2. The rear stabilizer and elevator assembly, generally at 30, includes a pivotally mounted horizontal stabilizer 34 and a pair of elevators 36. The horizontal stabilizer 34 is attached to the tail-cone, generally at 32, in an aft portion 38 of the tail cone 32. The attachment of the horizontal stabilizer 34 is accomplished by providing pivot shafts which are located in the trailing portion of the horizontal stabilizer 34, which pivot shafts are well known, are not illustrated, and which form no part of the present invention. The horizontal stabilizer is attached to the tail-cone aft portion 38, of the aircraft's fuselage 22, through the provision of horizontal stabilizer pivot shaft receiving apertures or bores 40 which are formed in the aft or rear portion 38 of the tail-cone portion 32 of the aircraft's fuselage 22. The mounting of the horizontal stabilizer pivot shafts these apertures or bores 40 is well known to those of skill in the art and again forms no portion of the present invention.

As is also well known to those familiar with the Cessna 180-185 series aircraft, the rear fuselages of such aircraft are typically reinforced by tail-cone reinforcement angles, often referred to as "hockey sticks" because of their shape, which somewhat resemble a typical hockey stick. These tail-cone reinforcement angles are attached to interior right and left portions of the rear section of the aircraft's fuselage. These tail-cone reinforcement angles are intended to provide structural rigidity to the aircraft's fuselage 22 and are intended to prevent inward deflection of that portion of the fuselage if lateral exterior pressure were to be applied to the fuselage, typically as a result of physical pressure being applied to the fuselage while the plane is being handling on the ground. A typical tail-cone reinforcement angle is depicted generally at 50 in FIGS. 4 and 5.

Figure 3:
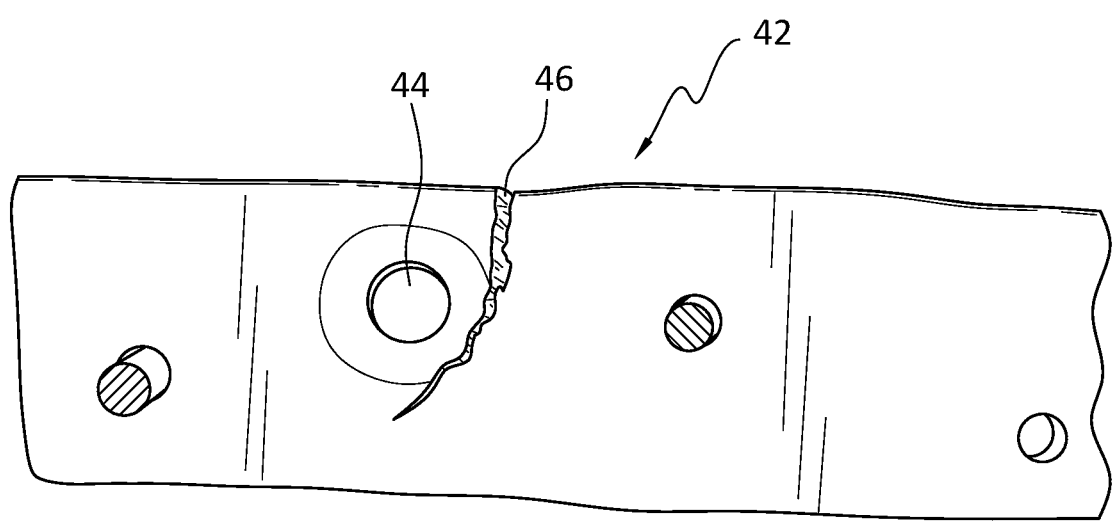
FIG. 3 is a photograph of an aft portion of a tail-cone reinforcement angle showing a typical failure in the horizontal stabilizer pivot shaft receiving bore of tail-cone reinforcement angle.

A rear "blade" portion 42 of each such tail-cone reinforcement angle 50, as seen at 42 in FIG. 3, is provided with a horizontal stabilizer pivot shaft receiving bore, indicated at 44, again in FIG. 3. Bore 44 is aligned with the horizontal stabilizer pivot shaft receiving apertures 40 in the aft portion 38 of the tail cone 32. These tail cone fuselage apertures 40 and their aligned tail-cone reinforcement angle blade bores 44 are aligned and form the mounting points for the horizontal stabilizer 34, as is known in the art.

As is also known in the art, the tail-cone stabilizer angles which were originally installed in the aircraft, during construction of each such aircraft, have been known to develop cracks. A typical crack is depicted at 46 in FIG. 3. These cracks are formed, or will form, in virtually every Cessna aircraft of the affected series. In the past, the prescribed treatment or repair was to remove the complete tail-cone reinforcement angle or angles of the affected side or sides of the aircraft, and to replace those removed elements with new, tail-cone reinforcement angles. That solution is not an effective one because is replaces a failed structural component with a replacement component that is subject to the same failure as was the original part which is replaced.

Figure 4:
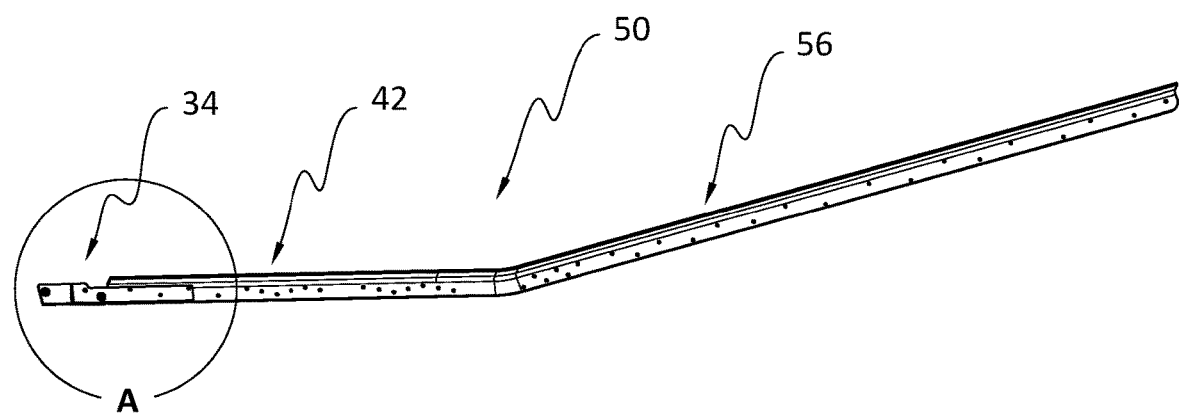
FIG. 4 is a perspective view of a left side tail-cone reinforcement angle including a left side tail-cone reinforcement angle splice, in accordance with the present invention.
Figure 5:
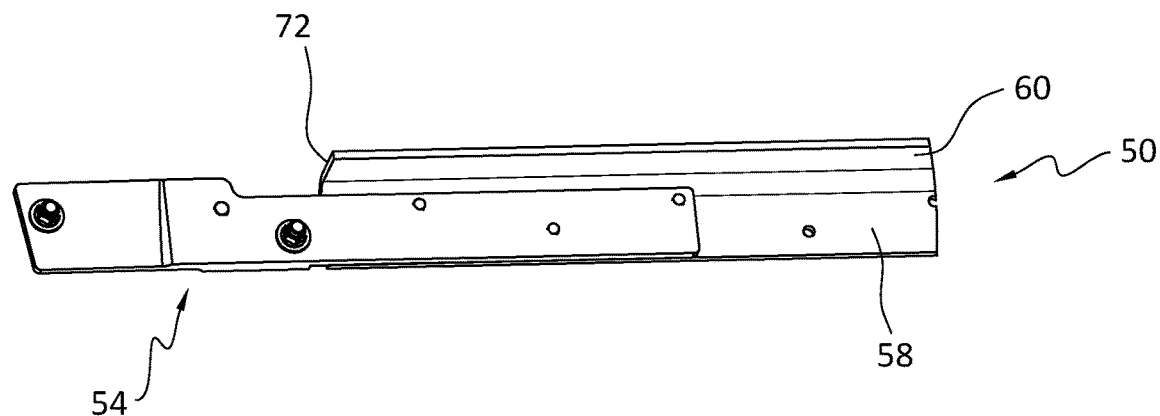
FIG. 5 is a side elevation view of an aft portion of the left side tail-cone reinforcement angle, encircled at A in FIG. 4, with the tail-cone reinforcement angle splice, in accordance with the present invention, in place.

Turning now to FIGS. 4 and 5, there may be seen generally at 50, a tail-cone reinforcement angle modified, in its rear, "blade" or aft portion 42, with a tail cone reinforcement angle splice, generally at 54, in accordance with the present invention. In the following discussion, the tail-cone reinforcement angle and its splice 54, will be described in the context of an assembly that is installed on the left or port side of the fuselage 22 of the aircraft. It will be understood that a similar tail-cone reinforcement angle assembly, with its associated angle splice, is also installable on the right or starboard side of the aircraft's fuselage and is also within the scope of the present invention. The two tail-cone reinforcement angles, with their attached angle splices, are mirror images of each other.

Referring again to FIGS. 4 and 5, the tail-cone replacement angle generally at 50, is constituted by an elongated structural member 56, formed typically of high strength aluminum and having a generally vertical web portion 58 and an inwardly directed upper flange portion 60. The web 58 and flange 60 are typically situated at generally 90 degrees to each other for rigidity. The web is secured, typically by riveting, to the interior of the rear portion of the aircraft's fuselage 22. In the original tail-cone reinforcement angle, the blade portion 42 included the horizontal stabilizer aft pivot shaft receiving bore 44, as depicted in FIG. 3. In the tail-cone reinforcement angle, including the angle splice 54, in accordance with the present invention, as will be discussed subsequently, the aft portion of the rear, blade portion 42 of the original equipment tail-cone reinforcement angle has been cut-off and the angle splice 54, in accordance with the present invention, has been substituted therefor.

Figure 6:
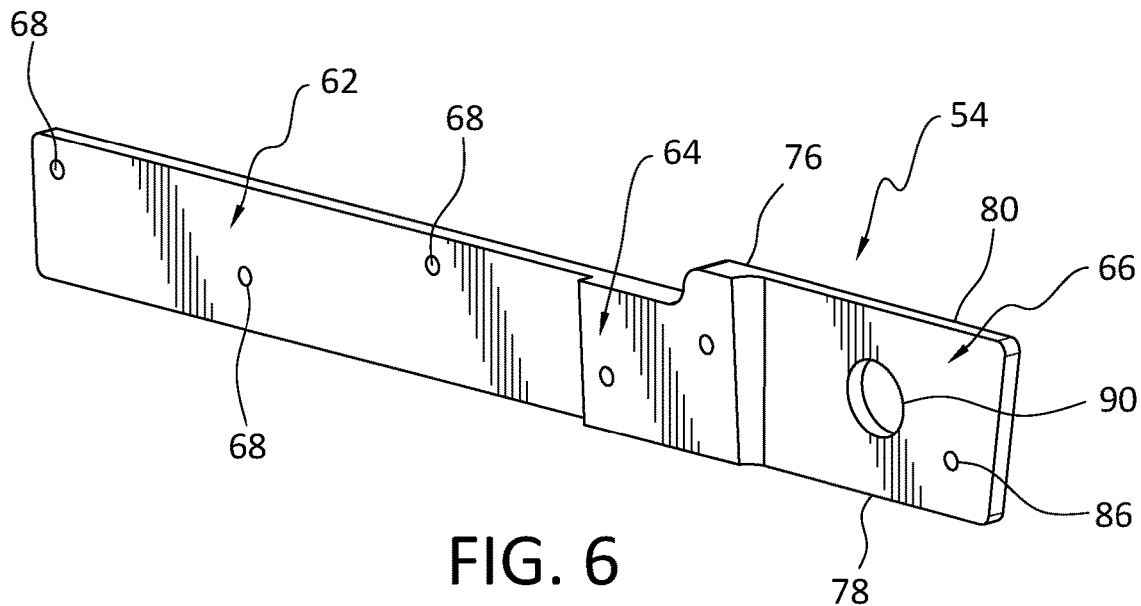
FIG. 6 is a perspective view of a left side tail-cone reinforcement angle splice prior to installation.
Figure 7:
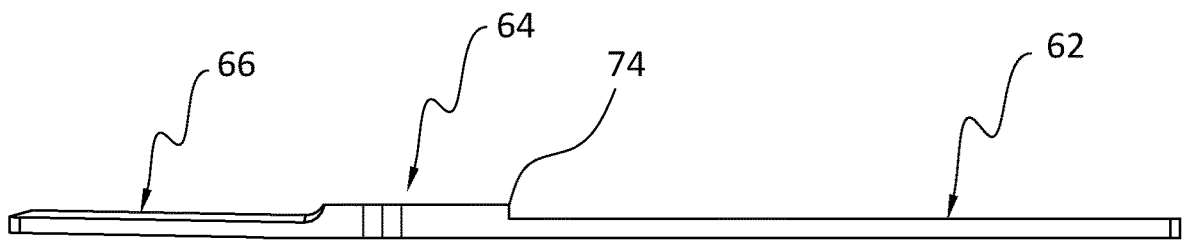
FIG. 7 is a top-plan view of the reinforcement angle splice depicted in FIG. 6.
Figure 8:
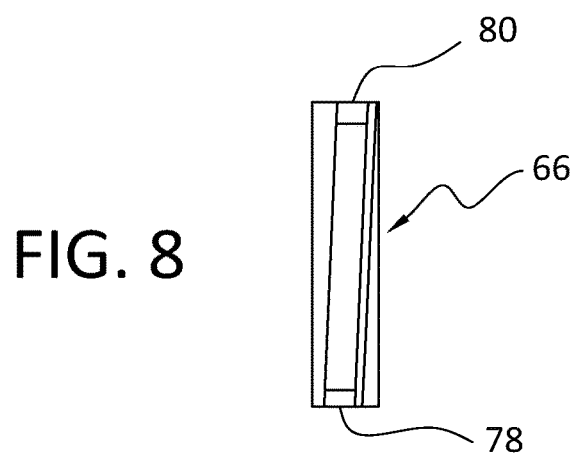
FIG. 8 is an aft end view of the reinforcement angle splice depicted in FIGS. 6 and 7 and taken from the right as seen in FIG. 6 and from the left as seen in FIG. 7.

Referring now to FIG. 6-8, there may be seen in greater detail a left side tail-cone reinforcement angle splice generally at 54, in accordance with the present invention. As noted above, a right side tail-cone reinforcement angle splice is essentially the same, in construction, installation and function as the left side splice 54 depicted in FIG. 6-8. The right and left splices 54 are different only in that they are mirror images of each other.

Splice 54, as depicted in FIG. 6, is configured generally as an elongated rectangular member which is typically fabricated from a high strength aluminum. Splice 54 includes a forward, overlap section 62, a central, transition section 64 and an aft, stabilizer rear pivot hole receiving section 66. The terms "forward", "central" and "aft" refer to the orientation of the splice in the fuselage of the aircraft, once the splice has been attached to the blade portion 42 of the tail-cone reinforcement angle, as seen, for example, in FIGS. 4 and 5.

The forward or overlap section 62 of the splice 54 has a plurality of spaced rivet receiving holes 68. These holes 68 will align with cooperatively spaced rivet receiving holes 70 in the web 58 of the blade portion of the tail-cone reinforcement angle 50. As may be seen in FIGS. 6 and 7, the forward, overlap section 62 of the splice 54 has a thickness, transverse to its length, which is reduced, in comparison to a thickness of the central, transition section 64. This is to allow the aft portion of the web 58 of the blade 42 of the tail-cone reinforcement angle 50, to overlie the forward, overlap section 62 of the splice 54 and to abut, at its aft-most edge 72, with a cooperating shoulder portion 74 of the central, transition section 64 of the splice 54. It will be understood, in the context of this discussion, that the aft or blade portion 42 of the original tail-cone reinforcement angle 50, has been removed. This removal is done to separate, from the original tail-cone reinforcement angle, its defective portion thereof, which defective portion is depicted in FIG. 3.

The central, transition section 64 of the splice 54 includes an intermediate step section 76, as can be seen in FIG. 6. The intermediate step portion 76 cooperates with the flange portion 60 of the blade portion 42 of the tail-cone reinforcement angle 50 to form a generally smooth upper planar surface, when the splice 54 has been joined to the rear blade 42 of the tail-cone reinforcement angle 50.

The horizontal stabilizer rear pivot hole receiving section 66 of the splice 54 is supplied, for its attachment to the blade 42 of the tail-cone reinforcement angle 50, without a horizontal stabilizer pivot shaft receiving bore, such as the one depicted at 44 in FIG. 3. This hole or bore 44 will be drilled into the aft section 66 of the splice 54, to align it with the corresponding aperture 40 in the tail-cone 44 in the aircraft's fuselage, once the splice 54 has been riveted and bolted in place, as will be discussed subsequently.

The aft section 66 of the splice 54 is generally planar, as may be seen in FIGS. 6 and 7. As may be seen particularly in FIG. 8, this aft section 66 is angled inwardly at approximately 2.44 degrees from its lower edge 78 to its upper edge 80. This slight inward angle is to accommodate the slight inward curve of the tail-cone section of the aircraft fuselage in the area of the horizontal stabilizer rear pivot shaft receiving aperture 40.

The installation process and method for accomplishing the repair of the originally installed tail-cone reinforcement angle, through the removal of the aft portion of the original blade thereof and by its replacement with the splice, in accordance with the present invention, will now be discussed. Again, this discussion will be directed to the repair and refurbishment and reinstallation of a left side tail-cone reinforcement angle. It is again understood that this discussion is equally applicable to the repair and reinstallation of a right side tail-cone reinforcement angle. The only difference is that, as discussed previously, the right side assembly is the mirror image of the left side assembly.

Figure 2:
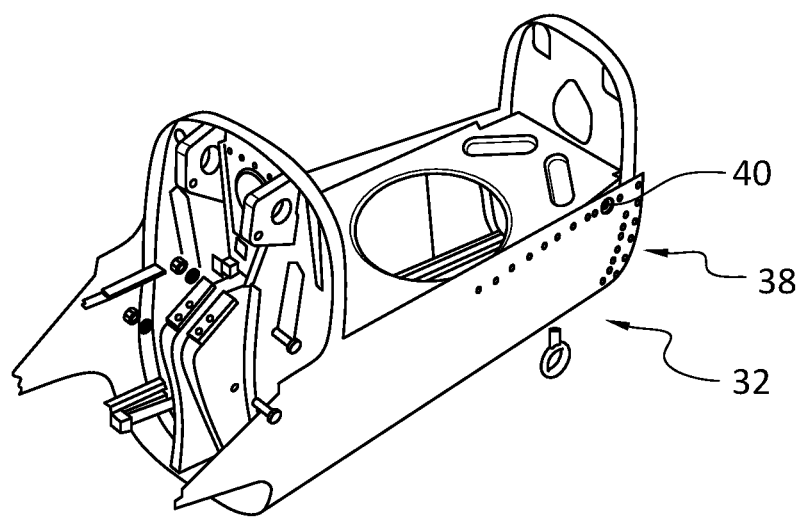
FIG. 2 is a schematic depiction of a tail-cone area of the Cessna 180-185 series aircraft depicted in FIG. 1, and with the horizontal stabilizer, elevator, tail, tail wheel and stinger removed.
Figure 9:
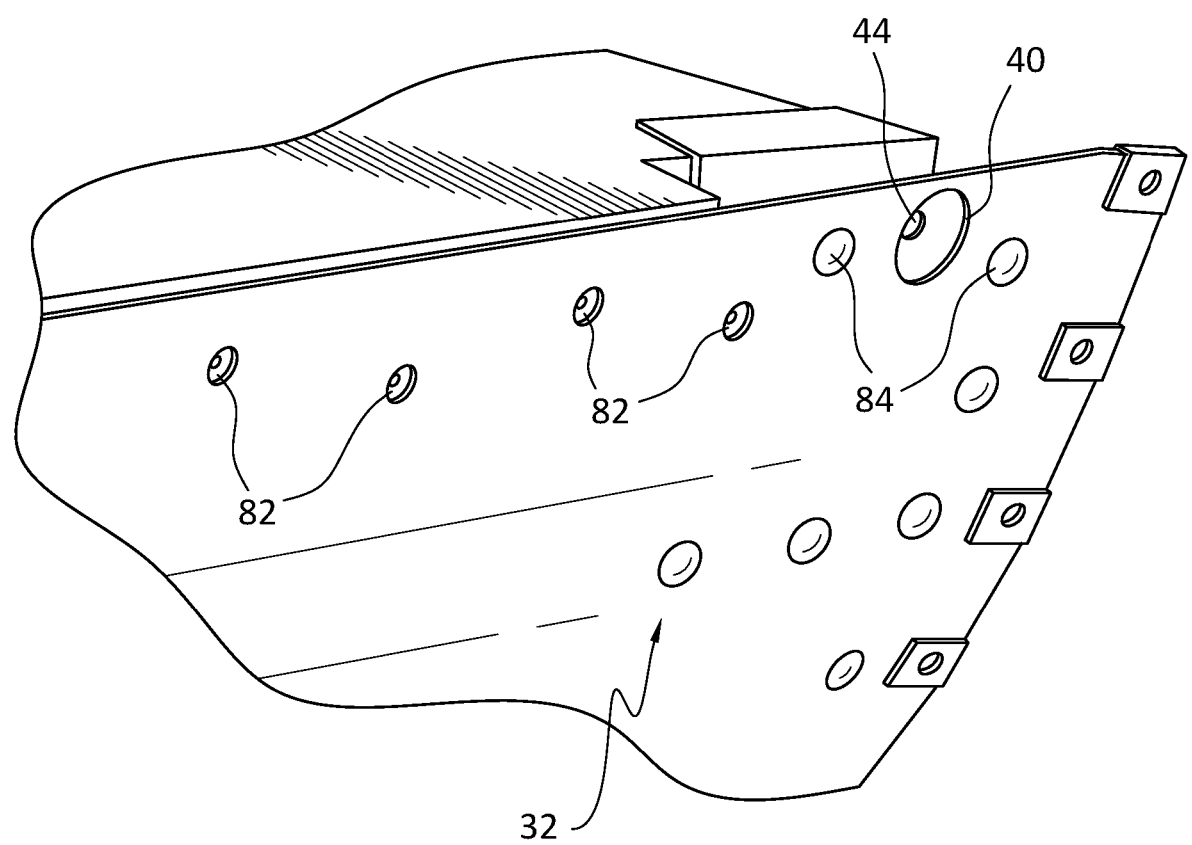
FIG. 9 is a view of an aft portion of the tail cone and showing the removal of four rivets.

Once the tail of the Cessna 180-185 series aircraft has been disassembled, to render the tail-cone assembly as it is depicted in FIG. 2, the installation process may commence. The initial step is to use a suitable reamer, which is supplied in a kit that is provided by the manufacturer of the subject invention, and which is supplied together with, and including the subject tail-cone reinforcement angle splice, as will be discussed subsequently, to ream out both the horizontal stabilizer rear pivot aperture 40 in the tail cone of the fuselage and the underlying bore 44 in the original far aft portion of the now defective tail-cone reinforcement angle. Once this has been accomplished, four aft flush rivets 82, in the tail cone portion 32 of the fuselage 22 and in the underlying blade portion 42 of the tail-cone reinforcement angle, are drilled out. This is depicted in FIG. 9 of the drawings accompanying the application. The holes in the web of the blade portion of the tail-cone reinforcement angle, which result from the drilling out of these four flush rivets 82, will align with the rivet receiving holes 68 in the forward or overlap section 62 of the splice 54.

In the next step of the repair and reconstruction process, two universal head rivets 84, as is also seen in FIG. 9, will be drilled out. This is accomplished using number 40 and number 30 drill bits that are included in the kit which is supplied by the manufacturer and which accompanies the splice 54. These number 40 and number 30 drill bits were also previously used in the removal of the four flush rivets 82. The reaming of the pivot aperture 40 and bore 44, together with the removal of the four flush head rivets 82 and the two universal head rivets 44, will free the defective portion of the blade section of the original tail-cone reinforcement angle from the tail cone portion of the fuselage of the aircraft.

Next, the defective portion of the original tail-cone reinforcement angle 50 is cut off from the reminder of the tail-cone reinforcement angle. This is best accomplished using a hack saw blade, including in the manufacturer supplied kit, taking care to cut the reinforcement angle adjacent the aft edge 72 of the upper flange 60 of the original tail-cone reinforcement angle 50. Once this after-most portion of the original tail-cone reinforcement angle has been removed, which removed portion is depicted in FIG. 3 of the drawings, the installation of the replacement tail-cone reinforcement angle splice 54 can be initiated.

Figure 11:
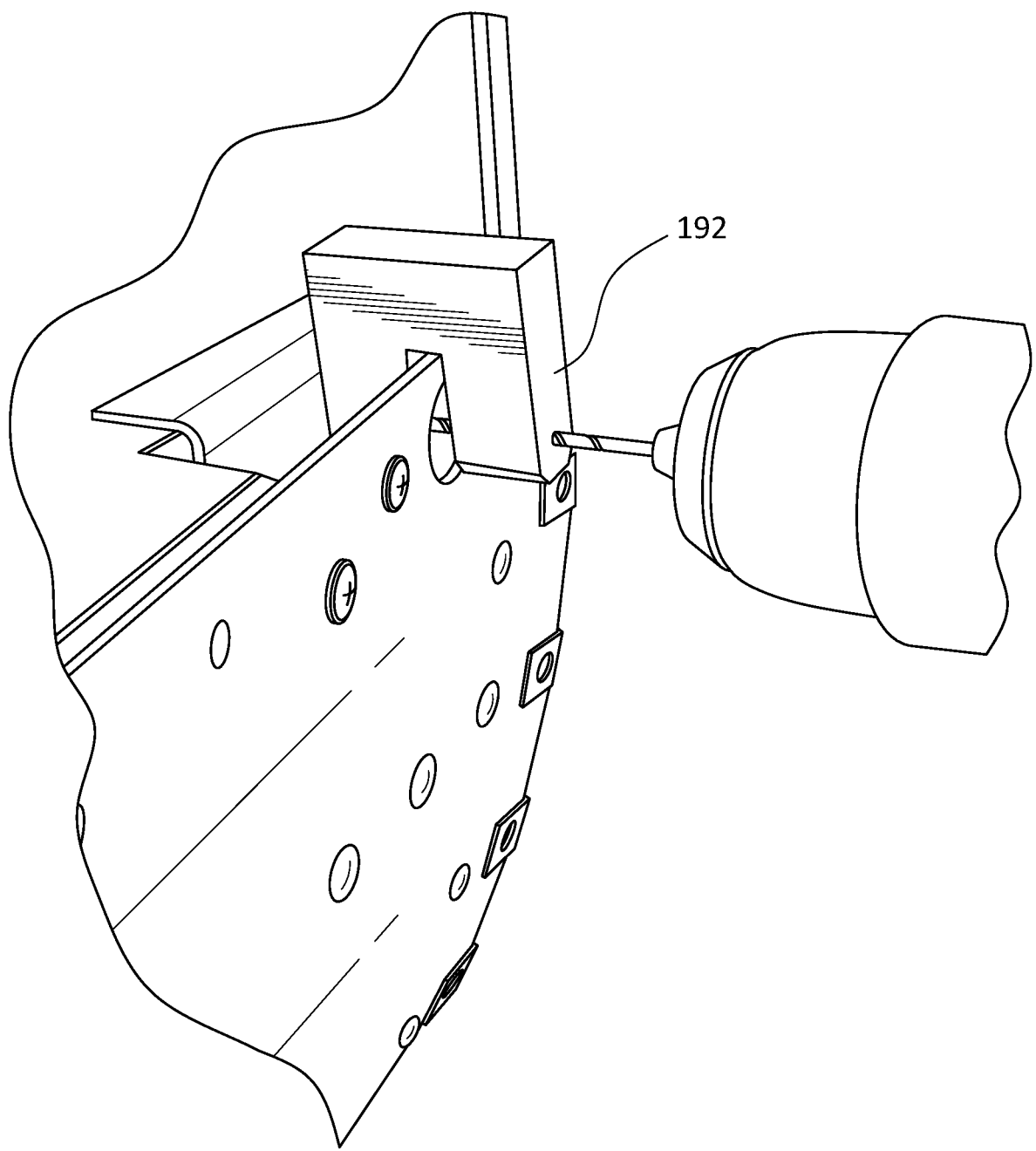
FIG. 11 is a view of the aft section of the tail cone and showing the forming of the horizontal stabilizer shaft receiving bore in the tail-cone reinforcement angle splice.

The tail-cone reinforcement angle splice 54 is placed inside the tail-cone portion 32 of the fuselage 22 of the aircraft and its several rivet receiving holes 68 aligned with the corresponding holes in the flange portion 58 of the rear, blade section 42 of the tail-cone reinforcement angle which was formed by the drilling out of the four flush head rivets 82. Suitable temporary fasteners such as cleco-type temporary fasteners are used to join the forward or overlap portion 62 of the splice 54 to the rear, aft-most section of the remaining rear, blade portion 42 of the tail-cone reinforcement angle. A suitable clamp can then be applied to the aft, stabilizer rear pivot hole receiving section 66 of the splice 54. Once that has been done, and the splice 54 is now temporarily secured to the tail-cone fuselage, at its aft end 66, and to the blade of the tail-cone reinforcement angle 50, at the splice's forward end 62, an aft replacement splice hole 86 can be drilled in the far aft portion of the aft section 66 of the splice 54, as seen in FIG. 6. While the splice 54 is still temporarily clamped and cleco-ed in place, the aft section 66 of the splice 54 is then drilled to form a suitable rear stabilizer pivot shaft receiving bore 90. This is accomplished by initially drilling a pilot hole in the aft most section of the splice using a drill guide fixture 92, as seen in FIG. 11. The drill guide fixture 92 is also included in the kit that is supplied by the manufacturer. Once the pilot hole has been drilled, a suitable quarter inch diameter reamer, which is included in the manufacturer-supplied kit, is used to form the horizontal stabilizer rear pivot shaft receiving hole 90 in the aft section of the splice 54.

Figure 10:
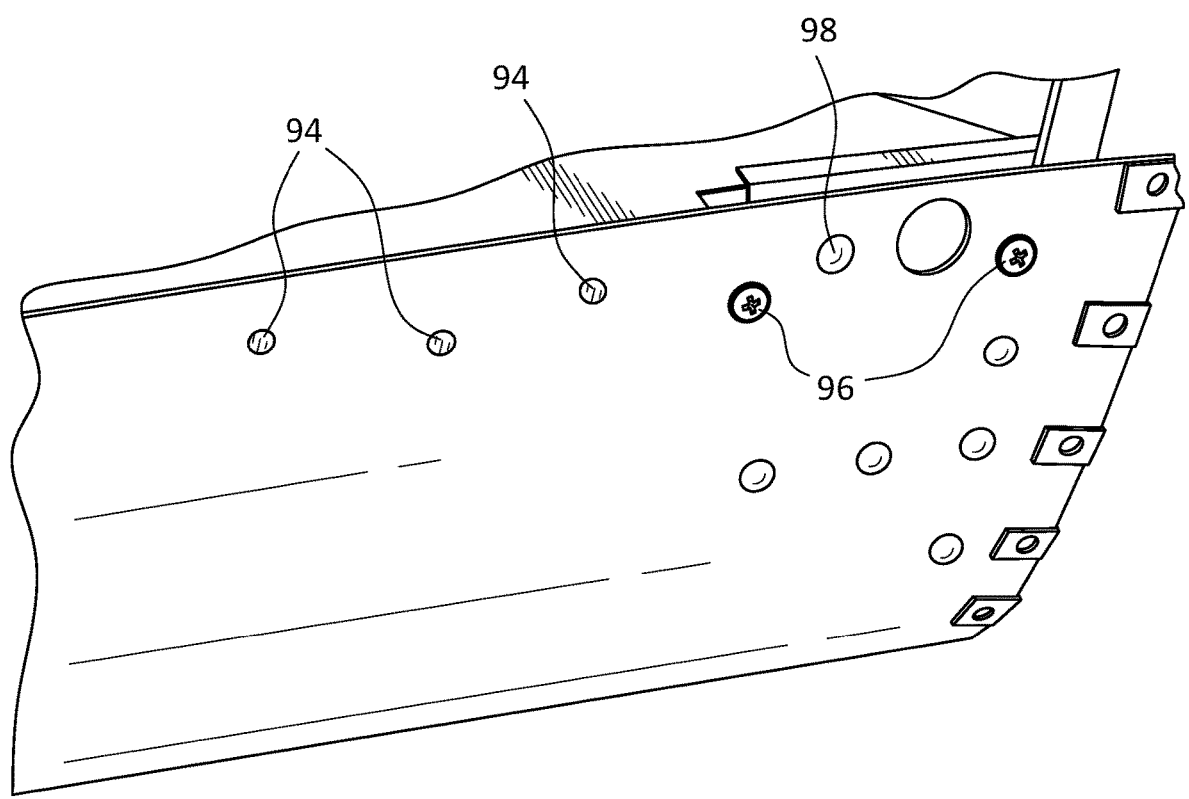
FIG. 10 is a view similar to FIG. 9 with the tail-cone reinforcement angle spice installed and secured in place.
Figure 12:
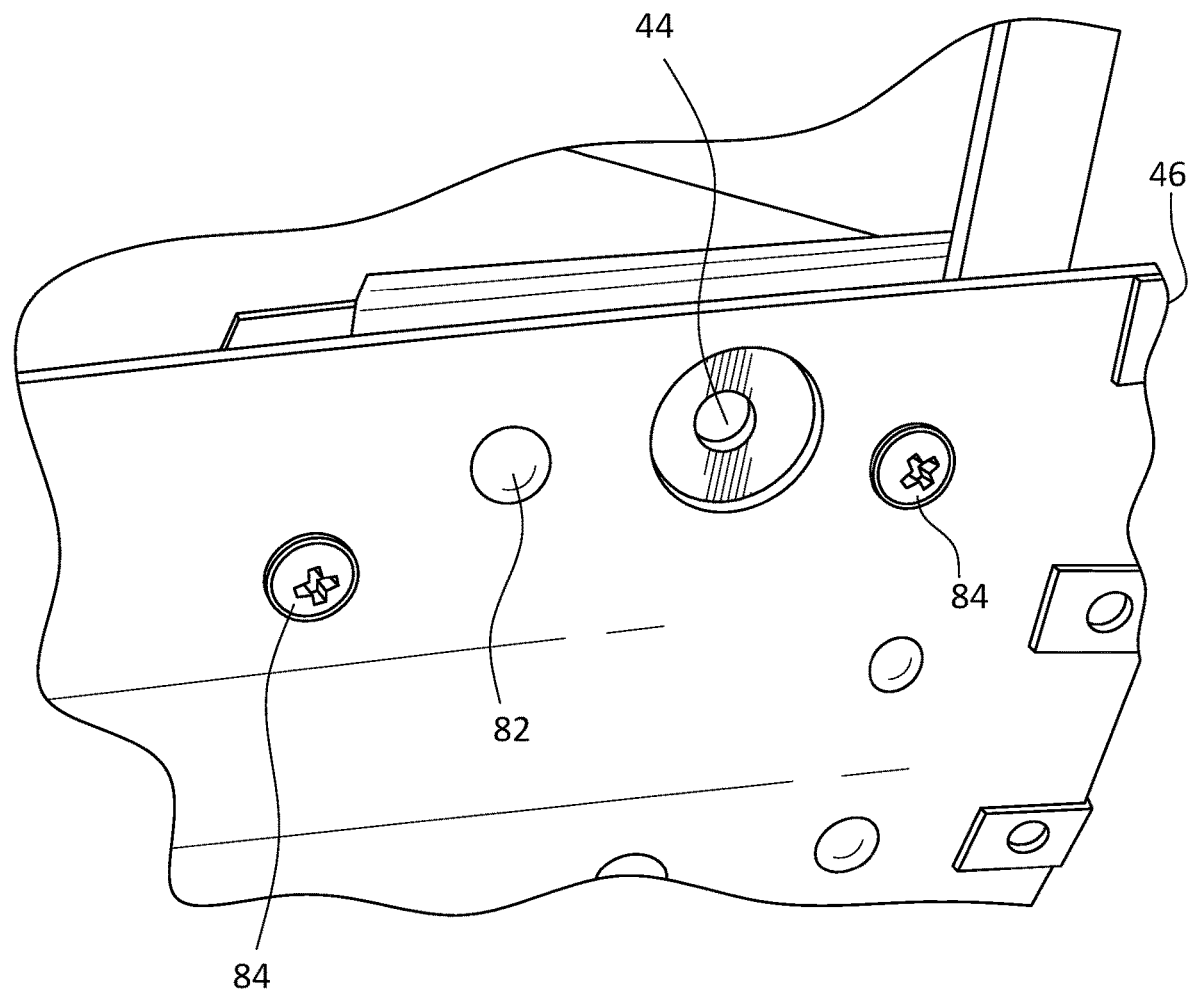
FIG. 12 is a view of the aft section of the tail cone and showing the completed horizontal stabilizer pivot shaft receiving bore formed in the tail-cone reinforcement angle splice.

Referring back to FIG. 10, once all the holes and bores have been reamed and drilled, four rivets 94 and two bolts 96 are installed. The finished installation of the tail-cone reinforcement angle splice, in accordance with the present invention, is depicted in FIG. 12. The aircraft's tail assembly can then be reassembled in accordance with the applicable Cessna service/maintenance manuals. The horizontal stabilizer and elevator can be reinstalled, using the hardware that was initially removed during a disassembly process of the aircraft. The appropriate actuating mechanisms and control cables can then be re-attached. Once it has been determined that the elevator, rudder and elevator trim are all working freely and properly, the aircraft is ready to be returned to operational status.

The repair of the tail-cone reinforcement angle, in accordance with the present invention, is accomplished using parts and tools which are supplied by the manufacturer in the form of a kit. The contents of such a kit are set forth in the table which is presented as FIG. 13. It is the intent of the manufacturer that all necessary parts and tools, which may be required for the successful repair of the Cessna 180-185 series aircraft tail-cone reinforcement angle, will be provided in such a kit. It will however be understood that the kit does not include typical repair facility equipment such as a rivet gun, temporary fasteners, a power operated drill and the like. It is assumed that a competent aircraft repair facility will have such equipment.

While a preferred embodiment of a Cessna tail-cone reinforcement angle splice, an installation kit for use therewith, and a method for installation of such a splice, in accordance with the present invention, have been set forth fully and completely herein above, it will be apparent to one of skill in the art that various changes could be made thereto, without departing from the true spirit and scope of the subject invention, which is accordingly to be limited only by the scope of the appended claims.

The invention claimed is:

1. A tail-cone reinforcement angle splice configured for use with a tail-cone reinforcement angle and to replace a defective aft section of a rear blade portion of the tail-cone reinforcement angle for a tail cone section of a fuselage of a Cessna 180-185 series aircraft, the tail-cone reinforcement angle splice comprising:

an elongated splice body having a plurality of splice body sections;

a forward, overlap section of the elongated splice body and forming a first one of the plurality of elongated splice body sections, the forward, overlap section having a first thickness in a direction transverse to a length of the elongated splice body and being configured for overlapping attachment to the rear blade portion of the tail-cone reinforcement angle whose defective aft section has been removed;

a central, transition section of the elongated splice body and forming a second one of the plurality of splice body sections and having a second thickness in the direction transverse to the length of the elongated splice body; and an aft, stabilizer pivot shaft receiving section of the elongated splice body and forming a third one of the plurality of splice body sections and configured to receive a stabilizer pivot shaft receiving bore, the aft, stabilizer pivot shaft receiving section being inclined at an acute angle, with respect to the first and second sections of the elongated splice body, to accommodate an inward curve of the tail-cone section of the aircraft fuselage.

2. The tail-cone reinforcement angle splice of claim 1 wherein the elongated splice body is generally rectangular.

3. The tail-cone reinforcement angle splice of claim 1 wherein the central, transition section of the elongated splice body includes at least first and second transition section rivet and bolt receiving holes.

4. The tail-cone reinforcement angle splice of claim 1 wherein the elongated splice body is aluminum.

5. The tail-cone reinforcement angel splice of claim 1 wherein the first thickness and the second thickness are different from each other.

6. The tail-cone reinforcement angle splice of claim 1 wherein the aft, stabilizer pivot shaft receiving section has a third thickness in the direction transverse to the length of the elongated spice body and wherein the third thickness is the same as the first thickness.

7. The tail-cone reinforcement angle splice of claim 1 wherein the elongated splice body is configured to receive a plurality of rivet and bolt receiving bores.

8. The tail-cone reinforcement angle splice of claim 7 wherein at least three of the rivet and bolt receiving bores are located in the forward, overlap section of the elongated splice body.

9. The tail-cone reinforcement angle splice of claim 1 wherein the central, transition section of the elongated splice body includes an upper surface including an intermediate step.

10. The tail-cone reinforcement angle splice of claim 9 wherein the intermediate step forms a transition between the forward, overlap section of the elongated splice body and the central, transition section of the elongated splice body.

\* \* \* \* \*